I. W. HAMMOND.
Shingling Bracket.

No. 197,360.  Patented Nov. 20, 1877.

Attest:
Jno. P. Brooks.
August Petersohn.

Inventor:
Isaac W. Hammond,
by C. A. Snow & Co.
Attys.

UNITED STATES PATENT OFFICE.

ISAAC W. HAMMOND, OF CONCORD, NEW HAMPSHIRE.

IMPROVEMENT IN SHINGLING-BRACKETS.

Specification forming part of Letters Patent No. 197,360, dated November 20, 1877; application filed August 21, 1877.

*To all whom it may concern:*

Be it known that I, ISAAC W. HAMMOND, of Concord, in the county of Merrimack and State of New Hampshire, have invented certain new and useful Improvements in Shingling-Brackets; and I do hereby declare that the following is a full, clear, and exact description thereof, which will enable others skilled in the art to which it appertains to make and use the same, reference being had to the accompanying drawings, which form a part of this specification, and in which—

Figure 2:
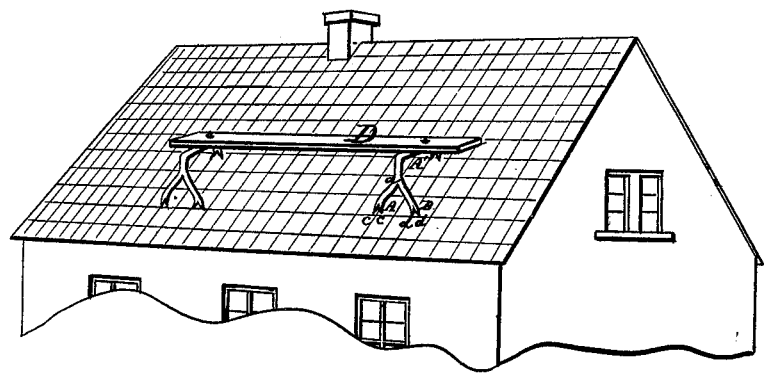
Figure 1:
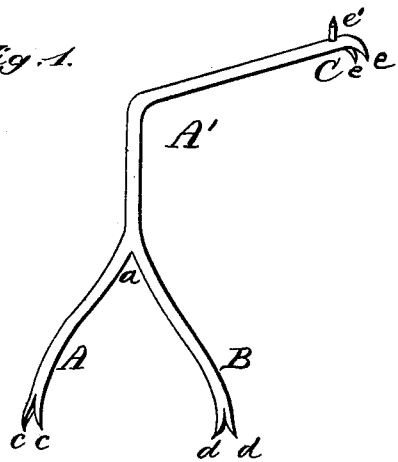

Figure 1 is a perspective view, and Fig. 2 is a similar view, showing my improved shingling-brackets with the staging-board in position upon a roof.

Similar letters of reference indicate corresponding parts in both the figures.

My invention relates to that class of devices that are used for supporting the staging-board in shingling or repairing roofs; and it consists in the construction of a spring shingling-bracket made in one piece, which combines strength and adaptability with great simplicity and cheapness of construction.

My improved shingling-bracket is made, preferably, of half-inch round iron or steel rods in two pieces, A and B, which are firmly united by welding at $a$. Each of the legs A B are bifurcated at their lower ends, the points $c\ c\ d\ d$ being sharpened, and curved inward so as to readily enter the shingles that have already been laid, and which serve as supports for the bracket. The longer arm A' is bent, as shown, its joint C being turned down, and bifurcated, as shown at $e\ e$, in a manner similar to the legs A B. About where the curve C begins is bored a hole vertically through arm A', into which is inserted a pin, $e'$, which serves to prevent the staging-board D from slipping off of arm A', if this, when used on a roof of comparatively small pitch, should be inclined against the roof.

By constructing the bracket as herein described, I obtain a bracket which is strong, cheap, light, and elastic, free from the stiffness and rigidity of wooden and other brackets of the same class, so that it will adapt itself to any little unevenness in the roof on which it is used, and form a firm, yet elastic, support for the staging-board D.

By making the part A' of iron or steel, in one piece, and bending it as shown, a spring is formed which, in placing the bracket upon a roof, will cause the bifurcated and inwardly-curved points at each end of the bracket to enter into the wood of the shingles, and thus hold the bracket firmly in position.

For placing the bracket upon a roof, the points $e\ e$ are first inserted. The operator then, grasping the parts A B with both hands, pulls them in an outward and downward direction, thereby enlarging the angle of the bracket, after which he places the points $c\ c\ d\ d$ against the roof, when the spring-tension of the bracket will cause the points to enter into the wood, and the bracket will be held firmly in position without danger of slipping.

Having thus described my invention, I claim and desire to secure by Letters Patent of the United States—

The elastic spring shingling-bracket herein described, made in one piece, of the iron or steel rods A, A', and B, welded together at $a$, and split at the ends to form the bifurcated legs $c\ c\ d\ d\ e\ e$, substantially as and for the purpose herein shown and specified.

In testimony that I claim the foregoing as my own I have hereto affixed my signature in presence of two witnesses.

ISAAC WEARE HAMMOND.

Witnesses:
A. B. THOMPSON,
JOHN K. STOKES.